United States Patent
Kim et al.

(10) Patent No.: US 8,603,668 B2
(45) Date of Patent: Dec. 10, 2013

(54) SECONDARY BATTERY

(75) Inventors: Kwangsoo Kim, Suwon-si (KR); Junghwan Lee, Suwon-si (KR); Sungmin Chu, Suwon-si (KR); Yongtae Kim, Suwon-si (KR); Sungho Cho, Suwon-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 373 days.

(21) Appl. No.: 12/926,976

(22) Filed: Dec. 21, 2010

(65) Prior Publication Data
US 2011/0151293 A1 Jun. 23, 2011

(30) Foreign Application Priority Data
Dec. 22, 2009 (KR) .................. 10-2009-0128876

(51) Int. Cl.
*H01M 2/08* (2006.01)
*H01M 2/12* (2006.01)
*H01M 10/50* (2006.01)
*H01M 2/02* (2006.01)

(52) U.S. Cl.
USPC ............. 429/174; 429/53; 429/62; 429/171

(58) Field of Classification Search
USPC ............. 429/62, 53, 164, 166, 171, 174
See application file for complete search history.

(56) References Cited

U.S. PATENT DOCUMENTS

| 7,981,541 B2 * | 7/2011 | Sato et al. ............ 429/174 |
| 2007/0154781 A1 | 7/2007 | Choi |
| 2009/0117459 A1 | 5/2009 | Hyung et al. |

FOREIGN PATENT DOCUMENTS

| JP | 05-325929 A | 12/1993 |
| JP | 2000-036293 A | 2/2000 |
| KR | 10-1999-0043709 A | 6/1999 |
| KR | 10-0381328 B1 | 4/2003 |
| KR | 10-2006-0037832 A | 5/2006 |
| KR | 10 2007-0071235 A | 7/2007 |
| KR | 10-20090046469 A | 5/2009 |

OTHER PUBLICATIONS

Korean Notice of Allowance in KR 10-2009-0128876, dated May 23, 2011 (Kim, et al.).

* cited by examiner

*Primary Examiner* — Ula C. Ruddock
*Assistant Examiner* — Thomas H. Parsons
(74) *Attorney, Agent, or Firm* — Lee & Morse, P.C.

(57) ABSTRACT

A secondary battery includes a can having an opening at a side thereof, an electrode assembly inside the can, the electrode assembly including a first electrode, a second electrode, and a separator disposed between the first electrode and the second electrode, a one-unit cap covering the opening of the can, the one-unit cap including a current interrupt unit, a cap-up on the current interrupt unit, a positive temperature coefficient (PTC) device between the current interrupt unit and the cap-up, and an adhesive unit attaching the current interrupt unit to the cap-up to integrate the current interrupt unit, the PTC device, and the cap-up with each other, and an insulating gasket sealing a space between the can and the one-unit cap to seal the can.

20 Claims, 5 Drawing Sheets

SECONDARY BATTERY

BACKGROUND

1. Field

Embodiments relate to a secondary battery.

2. Description of the Related Art

With the rapid development of electronics, communication and computer industries, portable electronic devices are now in widespread use. Secondary batteries, i.e., rechargeable batteries, may be used as power sources of such portable electronic devices.

In the manufacture of a secondary battery, since the secondary battery includes a plurality of components, an overall assembly process time may increase due to several separate individual assembly processes. In addition, when the plurality of components is assembled, defects in the secondary battery may increase due to, e.g., overall inaccurate assembly via the several assembly processes.

SUMMARY

Embodiments are therefore directed to a secondary battery, which substantially overcomes one or more of the problems due to the limitations and disadvantages of the related art.

It is therefore a feature of an embodiment to provide a secondary battery in which the number of components to be assembled is minimized.

At least one of the above and other features and advantages may be realized by providing a secondary battery, including a cylindrical can having an opening at a side thereof, an electrode assembly received into the cylindrical can, the electrode assembly including a first electrode, a second electrode, and a separator disposed between the first electrode and the second electrode to insulate the first electrode from the second electrode, a one-unit cap unit covering the opening of the cylindrical can, and an insulating gasket disposed between the cylindrical can and the one-unit cap, the insulating gasket sealing a space between the cylindrical can and the one-unit cap to seal the inside of the cylindrical can, wherein the one-unit cap includes a current interrupt unit, a positive temperature coefficient (PTC) device disposed on the current interrupt unit, a cap-up disposed on the PTC device, and an adhesive unit mechanically attaching the current interrupt unit to the cap-up to integrate the current interrupt unit, the PTC device, and the cap-up with each other.

The adhesive unit may include a double-sided adhesive tape. The adhesive unit may include an adhesive. The adhesive unit may include a base sheet and adhesive layers disposed on both side surfaces of the base sheet. The adhesive unit may be formed of an insulating material.

The current interrupt unit may include a safety vent having a disk shape and including a protrusion protruding downwardly at a central portion thereof, an insulator disposed below the safety vent, a bottom cap disposed below the insulator and having a through-hole through which the protrusion of the safety vent passes, and a current interrupt part blocking the through-hole of the bottom cap and fixed to the bottom cap, the PTC device may have a disk shape, the cap-up may include a cap-up body having a disk shape and a cup-up protrusion extending from an inner surface of the cap-up body and protruding toward the outside of the cylindrical can, and the adhesive unit attaches the safety vent of the current interrupt unit to the cap-up body.

The adhesive unit may contact an inner surface of the PTC device, the safety vent of the current interrupt unit, and the cap-up body. The adhesive unit may not contact the PTC device, but be spaced from the PTC. The electrode assembly may include a first electrode tab electrically connecting the first electrode to the current interrupt part, and a second electrode tab electrically connecting the second electrode to the cylindrical can. The secondary battery may further include top and bottom insulating plates on top and bottom surfaces of the electrode assembly, respectively.

Outer edges of the current interrupt unit, PTC device, and cap-up may be aligned, the adhesive unit directly contacting the current interrupt unit and the cap-up. The PTC device may be directly between the current interrupt unit and the cap-up, and the adhesive unit is directly connected to the current interrupt unit and the cap-up. Each of the current interrupt unit, PTC device, cap-up, and adhesive unit may extend along an entire perimeter of the opening of the can. The current interrupt part may be directly connected to the bottom cap and the protrusion of the safety vent.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
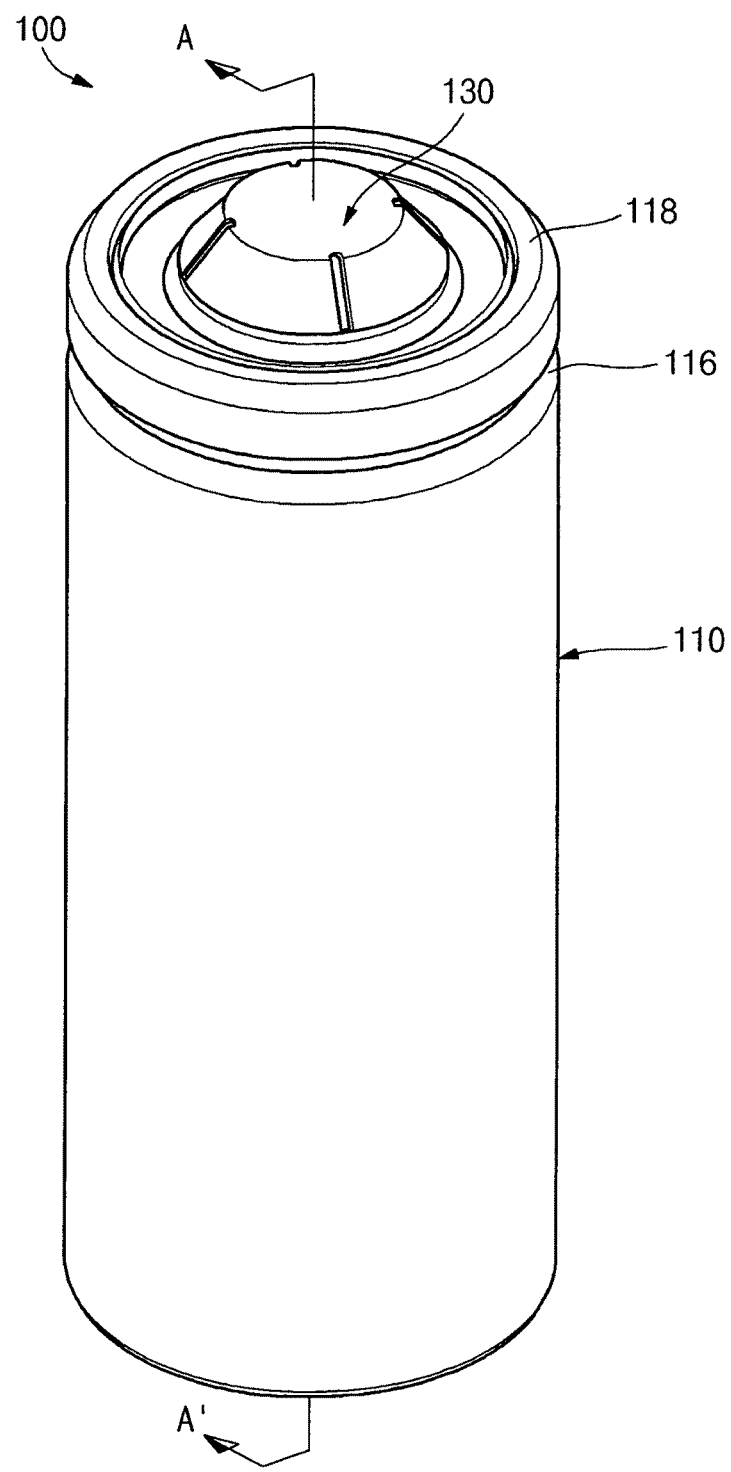
FIG. 1 illustrates a perspective view of a secondary battery according to an embodiment.

Korean Patent Application No. 10-2009-0128876, filed on Dec. 22, 2009, in the Korean Intellectual Property Office, and entitled: "Secondary Battery," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

Figure 2:
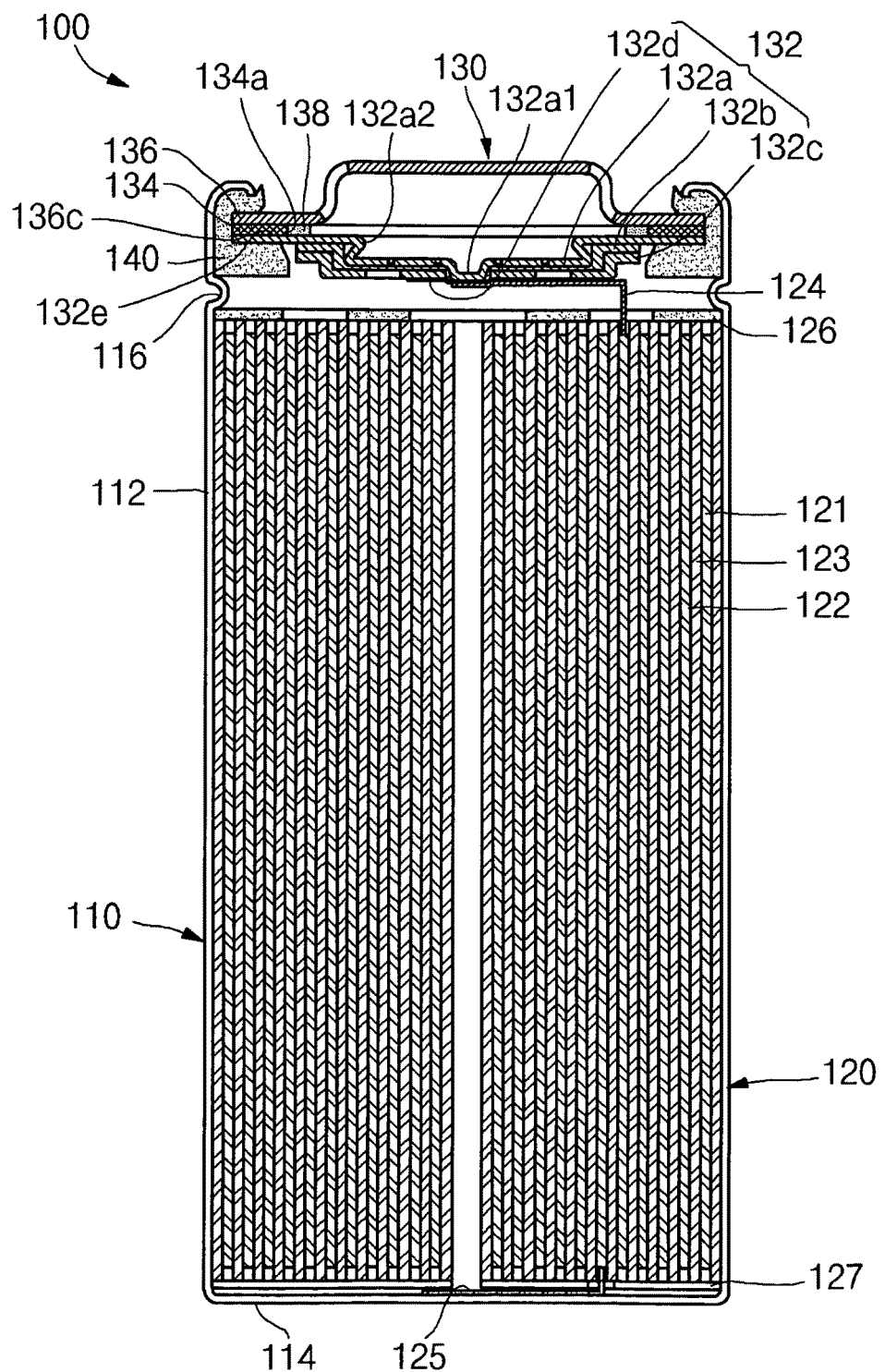
FIG. 2 illustrates a sectional view taken along line A-A' of FIG. 1.
Figure 3:
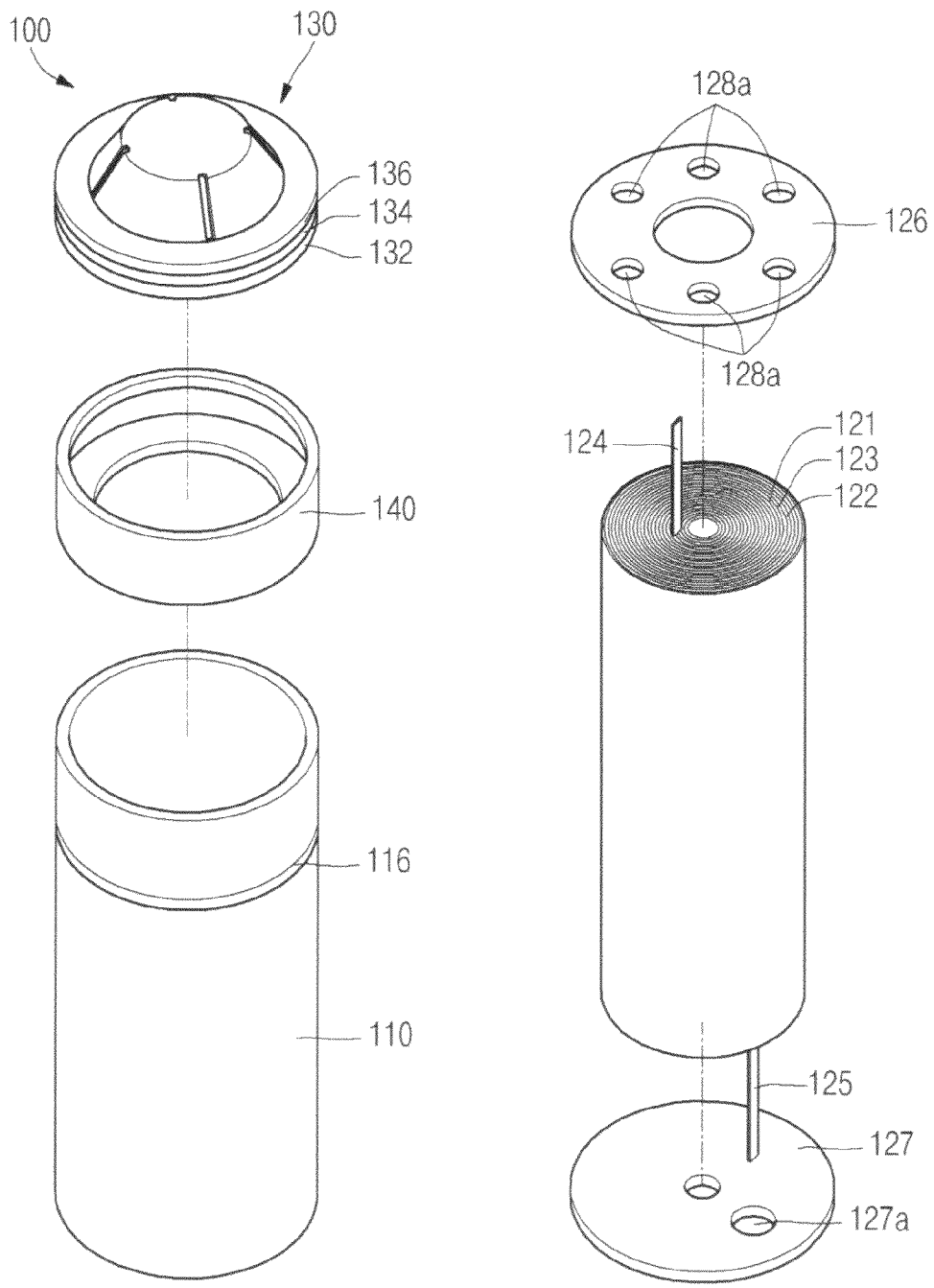
FIG. 3 illustrates an exploded perspective view of the secondary battery according to an embodiment.
Figure 4:
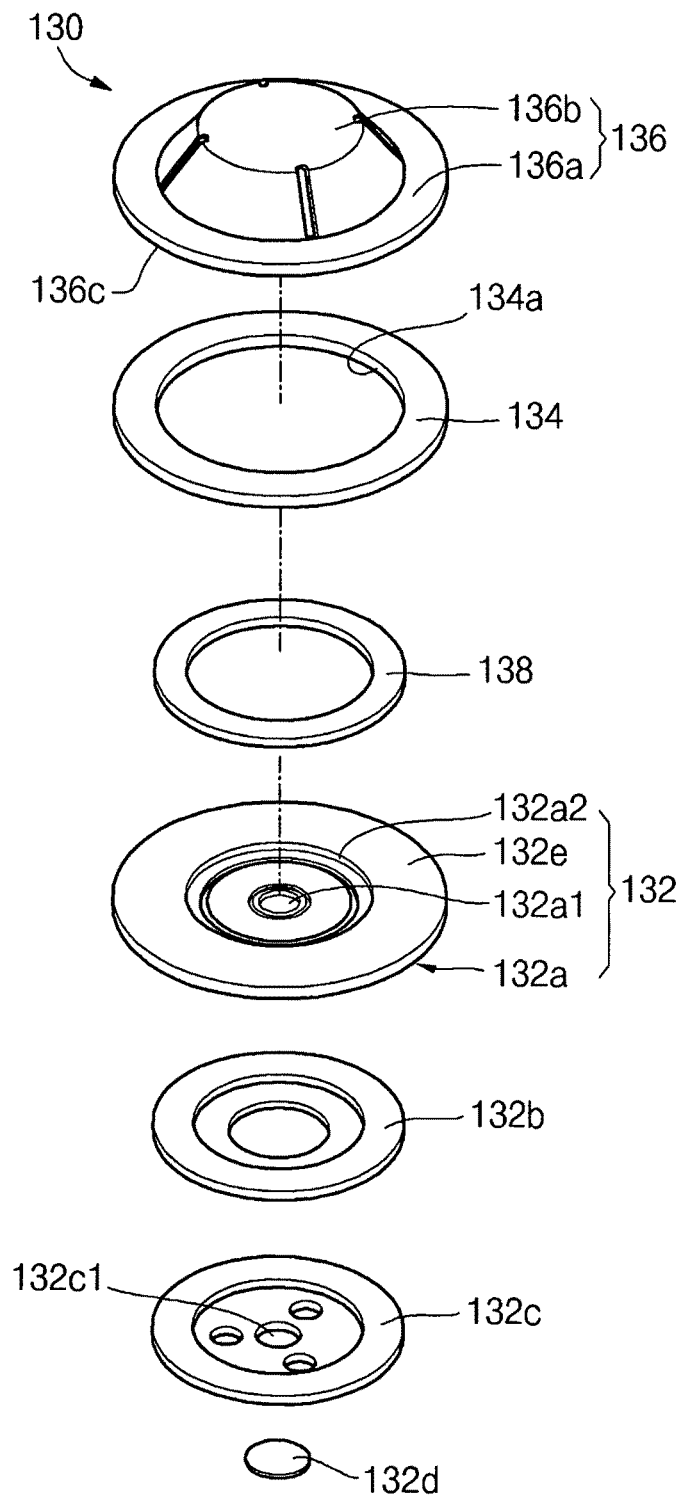
FIG. 4 illustrates an exploded perspective view of a one-unit cap that is a part of the secondary battery according to an embodiment.

FIG. 1 illustrates a perspective view of a secondary battery according to an embodiment, and FIG. 2 illustrates a sectional view taken along line A-A' of FIG. 1. FIG. 3 illustrates an exploded perspective view of the secondary battery according to an embodiment, FIG. 4 illustrates an exploded perspective view of a one-unit cap that is a part of the secondary battery according to an embodiment.

Referring to FIGS. 1 to 4, a secondary battery 100 according to an embodiment may include a can 110, an electrode assembly 120, a one-unit cap 130, and an insulating gasket 140. The one-unit cap 130 may include a current interrupt unit 132, a positive temperature coefficient (PTC) device 134, a cap-up 136, and an adhesive unit 138.

The can 110 may have any suitable shape, e.g., an approximately cylindrical shape having an opening at one side thereof. Hereinafter, the terms "can" and "cylindrical can" will be used interchangeably for convenience only. As illustrated in FIG. 2, the cylindrical can 110 may have a receiving space, in which the electrode assembly 120 may be received. Also, the cylindrical can 110 may have a cylindrical surface 112 having a certain diameter and defining sidewalls of the can 110, and a lower surface 114, i.e., a bottom surface connected to the cylindrical surfaces 112 and positioned opposite to the opening of the cylindrical can 10.

As further illustrated in FIG. 2, the one-unit cap 130 may fit into the opening of the cylindrical can 110 at a certain position of the cylindrical surface 112. For example, the one-unit cap 130 may be surrounded by portions of the cylindrical surface 112 in the opening of the cylindrical can 110, and may be positioned on a beading part 116 protruding inwardly from the cylindrical can 110 to seat or support the insulating gasket 140.

As illustrated in FIG. 1, the cylindrical can 110 may further include a creeping part 118. The creeping part 118 may bend inwardly from the cylindrical can 110 to compress the one-unit cap 130 and the insulating gasket 140, which are disposed thereon.

The cylindrical can 110 may function as a terminal, and may be formed of a metal material, e.g., aluminum, iron, or an alloy thereof.

As illustrated in FIG. 2, the electrode assembly 120 may be positioned inside the cylindrical can 110 through the opening of the cylindrical can 110. The electrode assembly 120 may include a first electrode 121, a second electrode 122, and a separator 123. The separator 123 may be disposed between the first electrode 121 and the second electrode 122 to insulate the first electrode 121 from the second electrode 122. The electrode assembly 120 may be a jelly-roll type electrode assembly in which the first electrode 121, the second electrode 122, and the separator 123 are wound into a circular shape.

As illustrated in FIGS. 2 and 3, the electrode assembly 120 may include a first electrode tab 124 electrically connecting the first electrode 121 to the one-unit cap 130. The electrode assembly 120 may further include a second electrode tab 125 electrically connecting the second electrode 122 to the cylindrical can 110.

The first electrode 121 may have a positive pole, and the second electrode 122 may have a negative pole. On the other hand, the first electrode 121 may have a negative pole, and the second electrode 122 may have a positive pole. As a result, the one-unit cap 130 may be a positive terminal, and the cylindrical can 110 may be a negative terminal. On the other hand, the one-unit cap 130 may be a negative terminal, and the cylindrical can 110 may be a positive terminal.

As further illustrated in FIGS. 2 and 3, the electrode assembly 120 may include a top insulating plate 126 and a bottom insulating plate 127 on respective top and bottom surfaces thereof. The top and bottom insulating plates 126 and 127 may prevent the first electrode 121 or the second electrode 122 of the electrode assembly 120 from being unnecessarily electrically connected to the cylindrical can 110 or the one-unit cap 130. As illustrated in FIG. 3, the top insulating plate 126 may have a plurality of through-holes 128a through which the first electrode tab 124 passes or an electrolyte is injected into the receiving part of the cylindrical can 110. The bottom insulating plate 127 may have a through-hole 127a through which the second electrode tab 125 passes.

As illustrated in FIGS. 1 and 2, the one-unit cap 130 may cover the opening of the cylindrical can 110 in which the electrode assembly 120 is received. As illustrated in FIG. 2, the one-unit cap 130 may be positioned, so that the current interrupt unit 132 may be positioned above the electrode assembly 120. The current interrupt unit 132 will be described in more detail below with reference to FIGS. 2 and 4.

As illustrated in FIGS. 2 and 4, the current interrupt unit 132 may include a safety vent 132a, an insulator 132b, a bottom cap 132c, and a current interrupt part 132d.

As illustrated in FIG. 4, the safety vent 132a may include a disk-shaped plate with an inner diameter 132a2. As illustrated in FIGS. 2 and 4, the safety vent 132a may include a protrusion 132a1 protruding downwardly from a center thereof.

As illustrated in FIGS. 2 and 4, the insulator 132b may be disposed below the safety vent 132a. The insulator 132b may have a disk shape at least partially overlapping the safety vent 132a.

The bottom cap 132c may be disposed below the insulator 132b. A through-hole 132c1 may be defined in a center of the bottom cap 132c. The safety vent 132a may be arranged, so the protrusion 132a1 of the safety vent 132a may protrude downwardly through the through-hole 132c1.

As illustrated in FIG. 2, the safety vent 132a may be insulated from the bottom cap 132c by the insulator 132b disposed therebetween. For example, as illustrated in FIG. 2, the insulator 132b may include at least two portions at different heights and parallel to each other, so the insulator 132b may conformally trace a partial profile of the bottom cap 132c. As such, even if the insulator 132b does not overlap the entire bottom cap 132c, a thickness of the insulator 132b between the bottom cap 132c and the safety vent 132 may be sufficient to prevent contact between the safety vent 132a and the bottom cap 132c.

As illustrated in FIGS. 2 and 4, the current interrupt part 132d may be fixed to a bottom surface of the bottom cap 132c, e.g., using laser welding, so the current interrupt part 132d may block, e.g., completely overlap, the through-hole 132c1 of the bottom cap 132c. Also, the current interrupt part 132d may be, e.g., directly, fixed to the protrusion 132a1 of safety vent 132a, e.g., using ultrasonic welding. As illustrated in FIG. 2, the first electrode tab 124 may be, e.g., directly, attached to a bottom surface of the current interrupt part 132d.

Thus, according to example embodiments, the secondary battery 100 may include a one-cap unit 130 having each of the safety vent 132a and the bottom cap 132c of the current interrupt unit 132, e.g., directly, welded to the current interrupt part 132d of the current interrupt unit 132. In other words, the current interrupt unit 132 of the secondary battery 100 may have the safety vent 132a, the insulator 132b, the bottom cap 132c, and the current interrupt part 132d integrated with each other.

Referring to FIGS. 2-4, the PTC device 134 of the one-cap unit 130 may be electrically connected to an upper portion of the current interrupt unit 132. The PTC device 134 may have a disk shape, and may be positioned on, e.g., directly on, the current interrupt unit 132, e.g., directly on the safety vent 132a. As illustrated in FIGS. 2 and 3, the PTC device 134 may have a substantially same outer diameter as that of the current interrupt unit 132. As further illustrated in FIGS. 2 and 4, the PTC device 134 may have an inner diameter greater than the inner diameter 132a2 of the current interrupt unit 132, i.e., a distance between inner and outer diameters of the safety vent 132a may be larger than a distance between inner and outer diameters of the PTC device 134.

The PTC device 134 may be formed of a material having a geometrically increasing resistance with increasing temperature. When the inside of the secondary battery 100 is heated above a certain temperature, the PTC device 134 may prevent current from flowing.

As illustrated in FIGS. 2-4, the cap-up 136 of the one-cup unit 130 may be electrically connected to an upper portion of the PTC device 134. As illustrated in FIG. 4, the cap-up 136 may include a cap-up body 136a having a disk shape, and a cap-up protrusion 136b. The cap-up protrusion 136b may extend from an inner surface of the cap-up body 136 and may protrude toward the outside of the cylindrical can 110, i.e., away from the cylindrical can 110.

As illustrated in FIGS. 2 and 3, the cap-up body 136a of the cap-up 136 may have a substantially same outer diameter as that of the PTC device 134. As illustrated in FIG. 2, the cap-up body 136a may have an inner diameter smaller than that of the inner diameter of the PTC device 134.

It is noted that when comparing sizes of the inner diameter 132a2 of the current interrupt unit 132, the inner diameter of the PTC device 134, and the inner diameter of the cap-up body 136a of the cap-up 136 to each other, the PTC device 134 may have the largest inner diameter. While either one of the current interrupt unit 132 and the cap-up body 136a of the cap-up 136 may have the smallest inner diameter, in order to smoothly operate the current interrupt unit 132, the inner diameter of the cap-up body 136a may be greater than the inner diameter 132a2 of the current interrupt unit 132.

As illustrated in FIG. 2, the adhesive unit 138 may mechanically couple, e.g., directly couple, the current interrupt unit 132 to the cap-up 136 to integrate the current interrupt unit 132, the PTC device 134, and the cap-up 136 with each other. That is, since the current interrupt unit 132 and the cap-up 136 adhere to each other by the adhesive unit 138, i.e., the safety vent 132a of the current interrupt unit 132 and the cap-up body 136a of the cap-up 136 adhere to each other, the current interrupt unit 132 and the cap-up 136 may be integrated with each other. Further, the integrated current interrupt unit 132 and the cap-up 136 may be integrated with the PTC device 134.

The adhesive unit 138 may contact, e.g., directly contact, the current interrupt unit 132, i.e., an upper surface 132e of the safety vent 132a, a lower surface 136c of the cap-up body 136a facing the surface 132e of the safety vent 132a, and an inner surface 134a of the PTC 134. As illustrated in FIG. 4, the adhesive unit 38 may have a disk shape to continuously contact the interrupt unit 132, the cap-up 136, and the PTC device 134.

Thus, since the one-unit cap 130 is integrated with the current interrupt unit 132, the PTC device 134, and the cap-up 136, when the secondary battery 100 including the one-unit cap 130 according to an embodiment is assembled, the assembly process may be simplified. In contrast, when a conventional secondary battery is assembled, each of a current interrupt unit, a PTC, and a cap-up may be individually assembled through different processes. However, in the assembly process of the secondary battery 100 according to an embodiment, since the current interrupt unit 132, the PTC 134, and the cap-up 136 may be assembled simultaneously using the one-unit cap 130, an overall assembly process time of the secondary battery 100 may be reduced. In addition, assembly mistakes and inaccuracies may be reduced, as separate assembly processes are minimized, thereby reducing defects in the secondary battery 100.

The adhesive unit 138 may be formed of an insulating material in order to prevent the current interrupt unit 132 and the cap-up 136 from being electrically connected to each other. For example, the adhesive unit 138 may be a double-sided adhesive tape adhering to both side surfaces of the current interrupt unit 132 and the cap-up 136. The adhesive unit 138 may include an adhesive material. The adhesive unit 138 may be a film including a base sheet and adhesive layers disposed on both side surfaces of the base sheet.

As illustrated in FIGS. 2-4, the insulating gasket 140 may be disposed between the one-unit cap 130 and the cylindrical can 110 to seal a space between the one-unit cap 130 and the cylindrical can 110, thereby sealing the inside of the cylindrical can 110. At this time, the creeping part 118 of the cylindrical can 110 may compress the insulating gasket 140 to allow the insulating gasket 140 to seal the inside of the cylindrical can 110.

Figure 5:
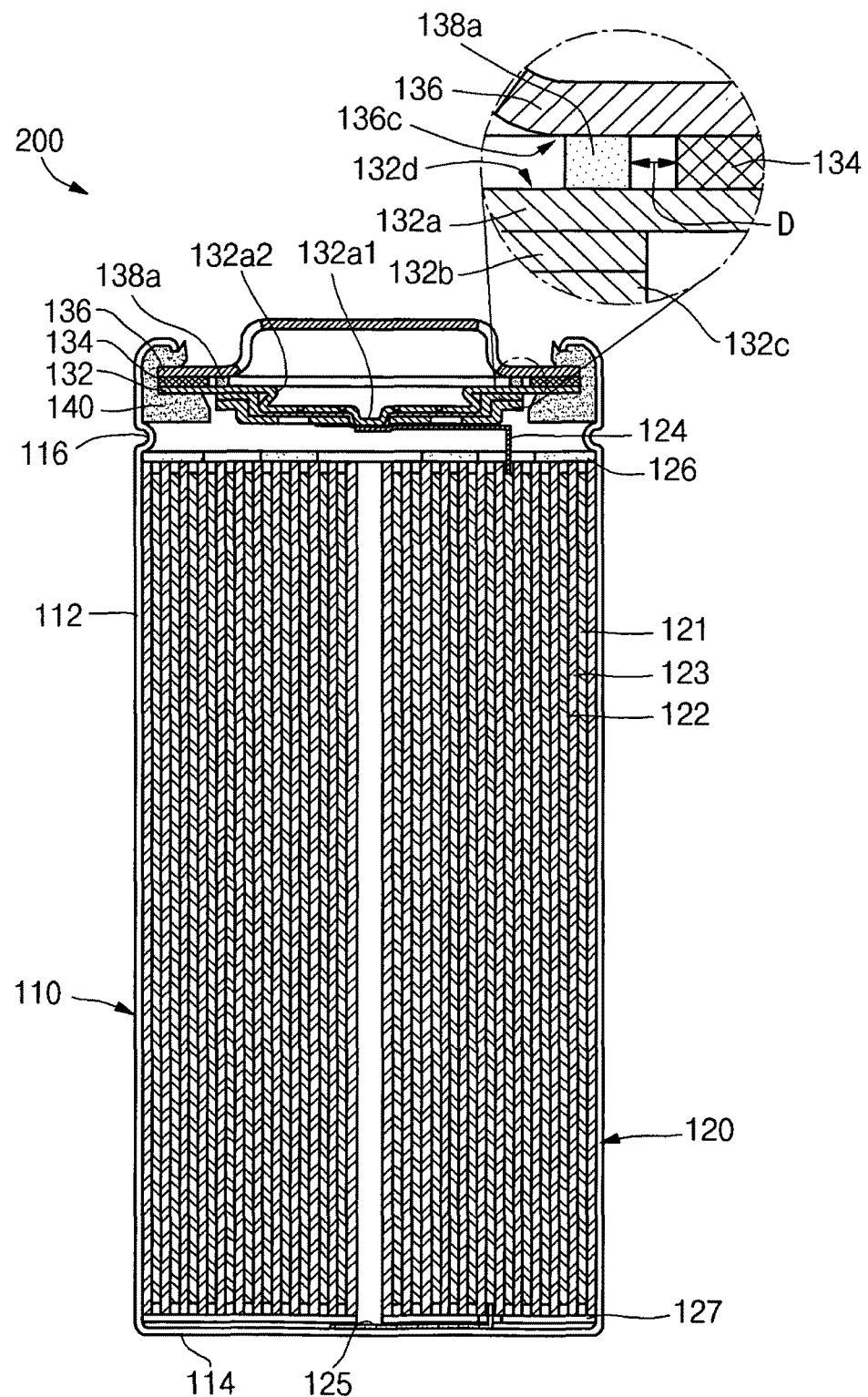
FIG. 5 illustrates a sectional view of a secondary battery according to another embodiment.

FIG. 5 illustrates a sectional view of a secondary battery according to another embodiment. Referring to FIG. 5, a secondary battery 200 according to another embodiment may have a substantially same structure and configuration as the secondary battery 100 described with reference to FIGS. 1 to 4, with the exception of a position of an adhesive unit 138a.

As illustrated in FIG. 5, the adhesive unit 138a of the secondary battery 200 may be spaced a certain distance D from the PTC device 134, while contacting the current interrupt unit 132 and the cap-up 136. That is, the adhesive unit 138a may have an outer diameter that is smaller than the inner diameter of the PTC device 134, e.g., by about the distance D.

In other words, the adhesive unit 138a may not contact the inner surface 134c of the PTC device 134. The adhesive unit 138a may contact only the upper surface 132e of the current interrupt unit 132 and the lower surface 136c of the cap-up body 136a to couple the current interrupt unit 132 to the cap-up 136. As a result, the current interrupt unit 132, the PTC device 134, and the cap-up 136 may be integrated with each other.

As described above, the secondary battery 100 may have a minimized number of components to be assembled. Therefore, battery defects due to assembly inaccuracies may be reduced.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:
1. A secondary battery, comprising:
a can having an opening at a side thereof;
an electrode assembly inside the can, the electrode assembly including a first electrode, a second electrode, and a separator disposed between the first electrode and the second electrode;
a one-unit cap covering the opening of the can, the one-unit cap including:
a current interrupt unit,
a cap-up on the current interrupt unit,
a positive temperature coefficient (PTC) device between the current interrupt unit and the cap-up, and
an adhesive unit between an upper surface of the current interrupt unit and a lower surface of the cap-up, the adhesive unit being configured to attach and integrate the current interrupt unit, the PTC device, and the cap-up with each other; and an insulating gasket sealing a space between the can and the one-unit cap to seal the can.

2. The secondary battery as claimed in claim 1, wherein the adhesive unit includes a double-sided adhesive tape.

3. The secondary battery as claimed in claim 1, wherein the adhesive unit is an adhesive.

4. The secondary battery as claimed in claim 3, wherein the adhesive includes an insulating material.

5. The secondary battery as claimed in claim 1, wherein the adhesive unit includes a base sheet and at least one adhesive layer on each side surface of the base sheet.

6. The secondary battery as claimed in claim 1, wherein the current interrupt unit includes:
   a safety vent having a disk-shaped plate and a protrusion protruding downwardly from a central portion of the disk-shaped plate;
   a bottom cap below a safety cap and having a through-hole, the protrusion of the safety vent passing through the through hole;
   an insulator between the safety vent and the bottom cap; and
   a current interrupt part attached to the bottom cap and blocking the through-hole of the bottom cap.

7. The secondary battery as claimed in claim 6, wherein the current interrupt part is directly connected to the bottom cap and the protrusion of the safety vent.

8. The secondary battery as claimed in claim 6, wherein the electrode assembly includes:
   a first electrode tab electrically connecting the first electrode to the current interrupt part; and
   a second electrode tab electrically connecting the second electrode to the can.

9. The secondary battery as claimed in claim 6, wherein:
   the PTC device has a disk shape,
   the cap-up includes:
      a cap-up body having a disk shape, and
      a cup-up protrusion extending from an inner surface of the cap-up body and protruding toward the outside of the can, and
   the adhesive unit is attached to the safety vent of the current interrupt unit and to the cap-up body.

10. The secondary battery as claimed in claim 9, wherein the adhesive unit contacts an inner surface of the PTC device, the safety vent of the current interrupt unit, and the cap-up body.

11. The secondary battery as claimed in claim 9, wherein the adhesive unit directly contacts only the safety vent of the current interrupt unit and the cap-up body.

12. The secondary battery as claimed in claim 1, further comprising top and bottom insulating plates on respective top and bottom surfaces of the electrode assembly.

13. The secondary battery as claimed in claim 1, wherein outer edges of the current interrupt unit, PTC device, and cap-up are aligned, the adhesive unit directly contacting the current interrupt unit and the cap-up.

14. The secondary battery as claimed in claim 1, wherein the PTC device is directly between the current interrupt unit and the cap-up, and the adhesive unit is directly connected to the current interrupt unit and the cap-up.

15. The secondary battery as claimed in claim 1, wherein each of the current interrupt unit, PTC device, cap-up, and adhesive unit extends along an entire perimeter of the opening of the can.

16. The secondary battery as claimed in claim 1, wherein the adhesive unit is in direct contact with the lower surface of the cap-up and with the upper surface of the current interrupt unit.

17. The secondary battery as claimed in claim 1, wherein the PTC device is directly between the adhesive unit and the insulating gasket.

18. The secondary battery as claimed in claim 1, wherein the PTC device surrounds the adhesive unit, the adhesive unit fitting within an inner diameter of the PTC device.

19. The secondary battery as claimed in claim 18, wherein upper surfaces of the PTC device and the adhesive unit are coplanar, and lower surfaces of the PTC device and the adhesive unit are coplanar.

20. The secondary battery as claimed in claim 1, wherein sidewalls of the PTC device and the adhesive unit are adjacent to each other and facing each other, the PTC device and the adhesive unit having a same thickness.

* * * * *